United States Patent [19]

Tsushima et al.

[11] Patent Number: 4,852,001
[45] Date of Patent: Jul. 25, 1989

[54] JOB SCHEDULING METHOD AND SYSTEM

[75] Inventors: Isao Tsushima, Yamato; Norihisa Komoda, Kawasaki; Masao Yagi, Tokyo; Tetsuo Kusuzaki, Kawasaki, all of Japan

[73] Assignee: Hitachi, Ltd., Tokyo, Japan

[21] Appl. No.: 74,767

[22] Filed: Jul. 17, 1987

[30] Foreign Application Priority Data

Jul. 25, 1986 [JP] Japan ................. 61-173645

[51] Int. Cl.⁴ ........................................... G06F 15/46
[52] U.S. Cl. .................................. 364/401; 364/468; 364/900
[58] Field of Search ............... 364/401, 402, 468, 403, 364/300, 200 MS File, 900 MS File

[56] References Cited

U.S. PATENT DOCUMENTS

| | | | |
|---|---|---|---|
| 3,643,227 | 2/1972 | Smith et al. | 364/900 |
| 3,648,253 | 3/1972 | Mullery et al. | 364/900 |
| 3,662,401 | 5/1972 | Collins et al. | 364/300 |
| 3,703,725 | 11/1972 | Gomersall | 364/468 X |
| 4,183,083 | 1/1980 | Chatfield | 364/200 |
| 4,383,298 | 5/1983 | Huff et al. | 364/200 |
| 4,580,207 | 4/1986 | Arai et al. | 364/900 X |

FOREIGN PATENT DOCUMENTS 1339090 11/1973 United Kingdom.
1452865 10/1976 United Kingdom.

OTHER PUBLICATIONS

Elmaghraby, Salah E., *Activity Networks*, John Wiley & Sons, Mar. 1977, pp. 144-149.

*Primary Examiner*—Joseph Ruggiero
*Attorney, Agent, or Firm*—Fay, Sharpe, Beall, Fagan, Minnich & McKee

[57] ABSTRACT

A job scheduling method for scheduling of job allocation to various resources, wherein each workload of a job is allocated to each time unit along a time axis in units of job and resource type. Based on the workload allocated in units of resource type, an initial workload for all resources at each time unit is calculated. A first workload balancing is performed for an initial workload at a time unit exceeding a resource capacity so as to balance the initial workload within the resource capacity. Thereafter, a second workload balancing is performed so as to balance a workload allocated in units of resource type within its resource capacity.

6 Claims, 11 Drawing Sheets

INITIAL WORKLOAD ALLOCATION RULE TABLE 106

| JOB NO. $P'_1$ | RESOURCE TYPE NO. $P'_2$ | NUMBER OF PERSONS $P_3$ | START TIME UNIT NO. $P'_4$ | FINISH TIME UNIT NO. $P'_5$ |
|---|---|---|---|---|
| | | | | |
| | | | | |
| | | | | |
| | | | | |

FIG. 4

WORKLOAD BALANCING RULE TABLE 107

| JOB NO. $P'_1$ | EARLIEST START TIME NO. $P'_2$ | LATEST START TIME NO. $P'_3$ | WORKLOAD BALANCING MEANS (RIGHT-OR LEFT-SHIFT OR CUT) $P_4$ | PRIORITY ORDER $P_5$ | CONTROL FLAG ·APPLICABLE; 0 ·NOT APPLICABLE; 1 |
|---|---|---|---|---|---|
| | | | | | |
| | | | | | |
| | | | | | |
| | | | | | |
| | | | | | |

FIG. 5

WORKLOAD BALANCING RULE TABLE FOR EACH RESOURCE TYPE 108

| RESOURCE TYPE NO. OF EXCESSIVE WORKLOAD $P'_1$ | JOB NO. $P'_2$ | RELIEVED RESOURCE TYPE NO. $P'_3$ | PRIORITY ORDER $P_4$ | CONTROL FLAG ·APPLICABLE; 0 ·NOT APPLICABLE; 1 |
|---|---|---|---|---|
| | | | | |
| | | | | |
| | | | | |
| | | | | |
| | | | | |

FIG. 6

CAPACITY DATA TABLE FOR EACH RESOURCE 109

| RESOURCE TYPE NO. (i) \ TIME UNIT NO. (j) | 1 | 2 | 3 | --- | j | --- | J |
|---|---|---|---|---|---|---|---|
| 1 | | | | | | | |
| 2 | | | | | | | |
| ⋮ | | | | | | | |
| i | | | | | $l(i,j)$ | | |
| ⋮ | | | | | | | |
| I | | | | | | | |

FIG. 7

CAPACITIVE DATA TABLE FOR ALL RESOURCES 110

| TIME UNIT NO. (j) | 1 | 2 | 3 | --- | j | --- | J |
|---|---|---|---|---|---|---|---|
| RESOURCE CAPACITY ($l(j)$) | | | | | | | |

WORKLOAD ALLOCATION RESULT TABLE FOR EACH JOB 111

| TIME UNIT NO. (j) / JOB NO. (k) | 1 | 2 | 3 | --- | j | --- | J |
|---|---|---|---|---|---|---|---|
| 1 | | | | | | | |
| 2 | | | | | | | |
| ⋮ | | | | | | | |
| k | | | | | m(k,j) | | |
| ⋮ | | | | | | | |
| K | | | | | | | |

FIG. 10

WORKLOAD ALLOCATION RESULT TABLE FOR EACH RESOURCE TYPE 112

| TIME UNIT NO. (j) / RESOURCE TYPE NO. (i) | 1 | 2 | 3 | --- | j | --- | J |
|---|---|---|---|---|---|---|---|
| 1 | | | | | | | |
| 2 | | | | | | | |
| ⋮ | | | | | | | |
| i | | | | | n(i,j) | | |
| ⋮ | | | | | | | |
| I | | | | | | | |

FIG. 11

WORKLOAD ALLOCATION RESULT TABLE FOR ALL RESOURCES 113

| TIME UNIT NO. (j) | 1 | 2 | 3 | --- | j | --- | J |
|---|---|---|---|---|---|---|---|
| RESOURCE CAPACITY (n(j)) | | | | | | | |

JOB SCHEDULING METHOD AND SYSTEM

BACKGROUND OF THE INVENTION

The present invention relates to a scheduling method for allocating a time and a job to each resource (person, installation), and more particularly to a job scheduling method suitable for a project which needs to consider a number of restrictions of the job allocation.

In order to complete a given project with limited resources (persons and installations), it is important to develop a schedule capable of allocating a suitable time and a suitable job to each resource. Without a proper schedule, jobs may concentrate on a particular resource or no job may be allocated to another particular resource thus leading to an inability to complete a workload per day.

Figure 2:
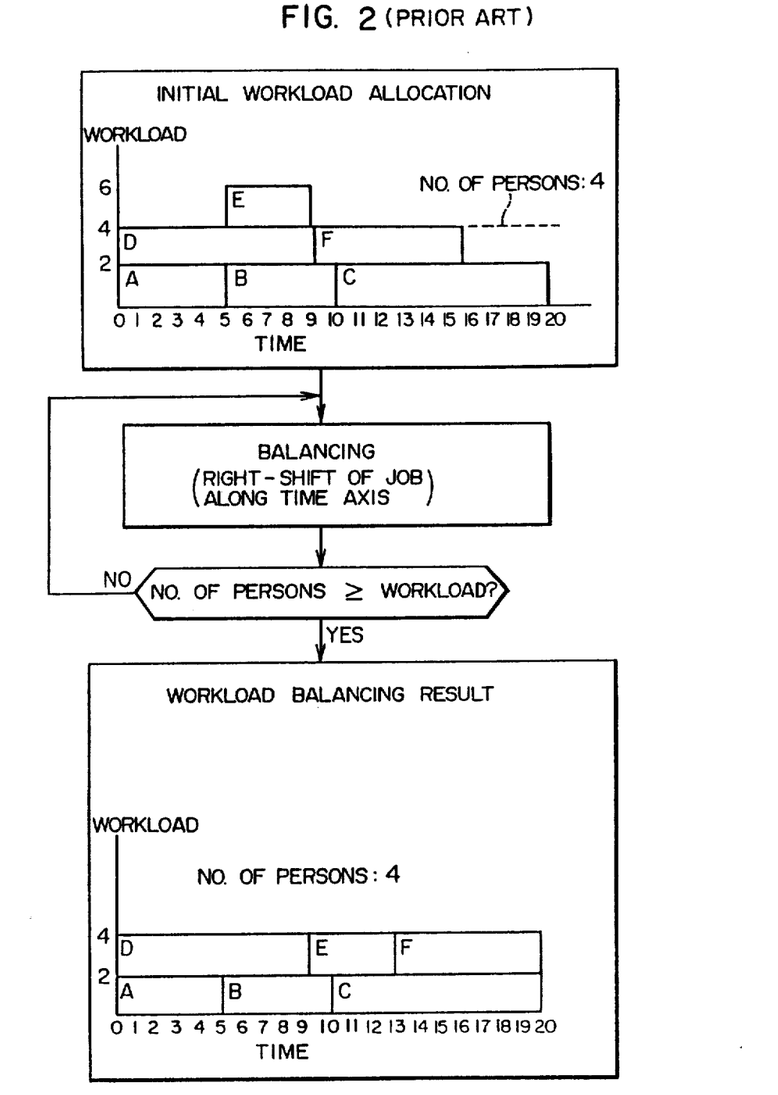
FIG. 2 is a schematic diagram illustrating a conventional system.

Job scheduling has applications to various fields. One practical scheduling method is known described, for example, in "ACTIVITY NETWORK", by Elmagraphy, pp. 144 to 149, JOHN WILEY & SONS, March 1977. A brief description of a conventional system of this type will be given with reference to FIG. 2.

First, an earliest start time is allocated to each job (indicated by A to E in the Figure) to obtain an initial workload allocation result. In the example shown in FIG. 2, it is assumed that two persons are necessary for each job and the total number of persons is four. According to the initial workload allocation result, six persons are required at a peak workload, which means a shortage of two persons. With a conventional system, workload balancing has been carried out to balance the workload within a limited number of persons. Since a start time for each job is given an earliest start time at the initial workload allocation, there is a job or jobs which can be shifted to the right along the time axis, i.e., can be delayed. Therefore, a job (illustratively job F) which can be completed at the latest finish time is selected among the jobs and shifted to the right to the latest start time before the appointed time (time 20 in this example). Succeedingly, the similar procedure as above is repeated until the workload is balanced within the resource capacity.

The above conventional system, however, cannot be applied to various fields and is not suitable for the application to other than the manufacturing industry.

SUMMARY OF THE INVENTION

It is an object of the present invention to provide a job scheduling method having a wide range of applications, an excellent optimum status, a good processing efficiency and a high descriptive nature.

To achieve the above object, scheduling in various fields has been analyzed to definitely show problems arising if the above conventional system is applied to the fields other than the manufacturing industry. The problems have been solved in the manner as described in the following, taking a job scheduling in a super market as an example.

(1) An alternative resource can be used for each job. According to the present invention, although a register clerk for example should generally be a clerk, a part timer or temporary employee does the work if the register clerk is busy at another work. If not possible, a management person is impelled to do the work. According to the conventional system, each resource doing a job is defined only in a general sense.

(2) A latest start time can be given to a particular job. According to the present invention, a finish time of an order for example can be given a time as late the order due time as possible. According to the conventional system, all jobs are given earliest start times at the initial workload allocation. A finish time may be given an order due time, but it is a mere chance.

(3) As means for balancing a peak workload in excess of the resource capacity, not only start time delaying function but also start time hastening function, job cutting function and job relieving function are added. It is necessary for the order job described in the above (2) to be shifted to the left if a start time is given a latest start time at the workload allocation. Further, if there is a peak workload in excess of the resource capacity even after the shift of a start time, a job cutting of "a certain work is not done today" is effected in an actual job scheduling. Furthermore, even if the total workload does not exceed the capacity for all resources, a peak workload of a certain resource type may exceed its capacity if a resource type most suitable for each job at a time is allocated as described in the above (1). In this case, a job relieving function for relieving the job by another resource is effected to balance the peak workload.

(4) A priority order of jobs is considered in balancing the workload. There occurs a case where a job is not desired to be shifted even if it has a room for shift. There is also a job which is not desired to be cut or relieved as described in the above (3). For example, a shop clean-up work should be cut rather than a register work which is more directly related to customer services.

In view of the above, a job scheduling system according to this invention is provided with means for describing initial workload allocation, and knowledge and know-how for the workload allocation, in the form of rules.

According to the present invention, by means of the above-described rule description means, it is possible to realize a system having a wide application field, in which system it is easy to describe, add and modify various knowledge and know-how for the workload allocation and the like. Further, an improved optimum status and processing efficiency can be attained because of the inclusion of the fundamental workload balancing functions described in the above (3).

DESCRIPTION OF THE PREFERRED EMBODIMENTS

Figure 1:
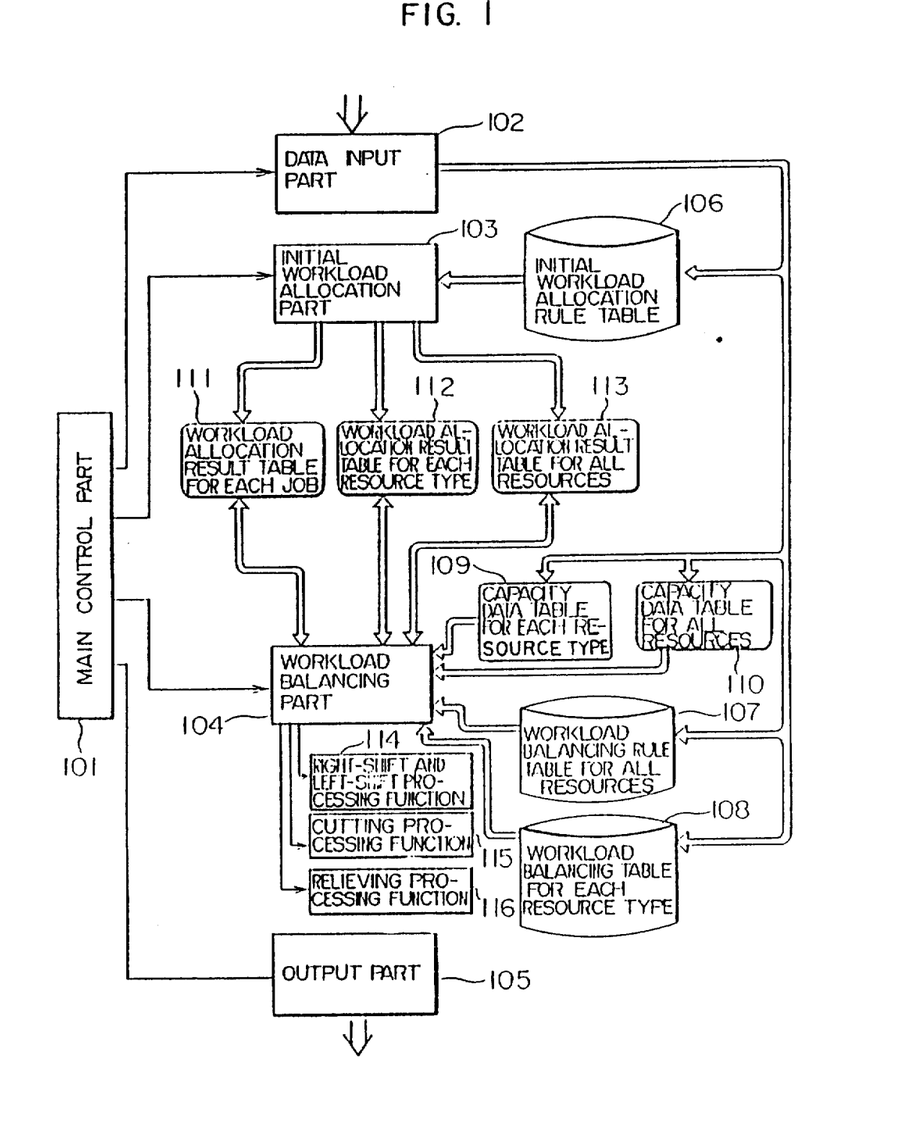
FIG. 1 is a functional block diagram showing an embodiment of a job scheduling system with various tables according to the present invention.

FIG. 1 is a functional block diagram showing an embodiment of a job scheduling system with various tables according to the present invention. The relationship between each block and table will be detailed later, as it becomes necessary, with reference to other figures.

A main control part 101 sequentially actuates and controls a data input part 102, an initial workload allocation part 103, a workload balancing part 104 and an output part 105, to thereby obtain a resultant output.

The input part 102 stores input data regarding rules and resource capacities in each table 106 to 113. The description for the tables will now be given hereinafter.

Figure 3:
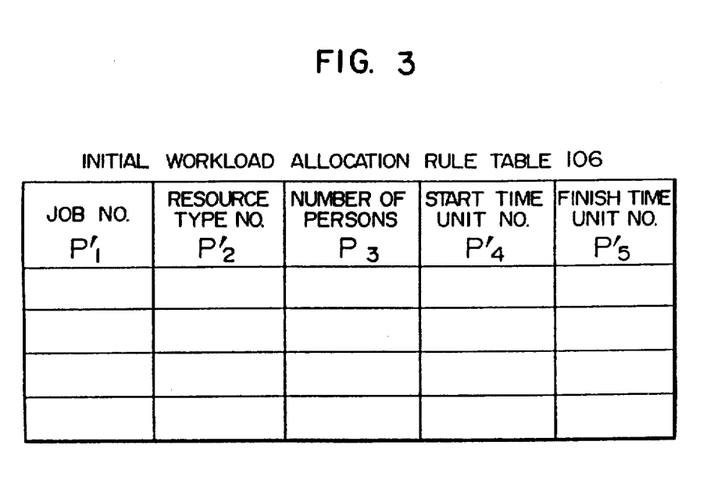
FIG. 3 is an initial workload allocation rule table.

FIG. 3 shows the structure of an initial workload allocation rule table 106. As a descriptive format for initial workload allocation rules, there is provided a basic statement of "as an initial workload for job [$P_1$], resource type [$P_2$] and number of persons [$P_3$] are allocated between [$P_4$] o'clock to [$P_5$] o'clock". $P_1$ to $P_5$ are given names and numerals for each job. The input part 102 stores the contents of a rule in the table 106 shown in FIG. 3, in accordance with the names and numeral values $P_1$ to $P_5$. Namely, the particular job name and resource type inputted as $P_1$ and $P_2$ are converted respectively into job number $P_1'$ and resource type number $P_2'$ by an editor in the computer for the purpose of simplicity of processing. The correspondence between them is decided when a rule is inputted. The inputted number of persons $P_3$ is stored directly in the table. The particular inputted times $P_4$ and $P_5$ are converted respectively into a start time unit number $P_4'$ and an end time unit number $P_5'$ by the editor in the computer. This correspondence between them is also decided when the rule is inputted. With this initial workload allocation rule, it is possible to allocate most suitable time units to the workload of a job.

Figure 4:
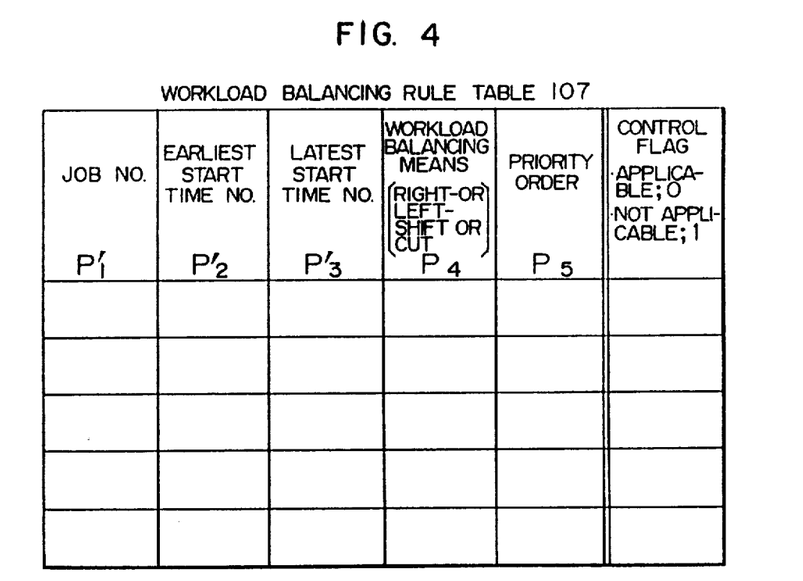
FIG. 4 is a workload allocation rule table (for all resources)

FIG. 4 shows the structure of a workload balancing rule table (for all resources) 107. As a descriptive format for workload balancing rules for all resources, there is provided a basic statement of "IF (workload exceeds the resource capacity), THEN (apply workload balancing means [$P_4$] to job [$P_1$] between [$P_2$] o'clock and [$P_3$] o'clock, with priority [$P_5$])". The input part 102 stores the contents of a rule in the table 107 shown in FIG. 4, in accordance with the names and numeral values $P_1$ to $P_5$. One of the names, i.e., right-shift, left-shift and cut, of workload balancing means is designated. A priority order during application of a rule is designated as [$P_5$].

The names and times inputted as $P_1$ to $P_3$ are converted by the editor in the computer into corresponding numbers $P_1'$ to $P_3'$.

Figure 5:
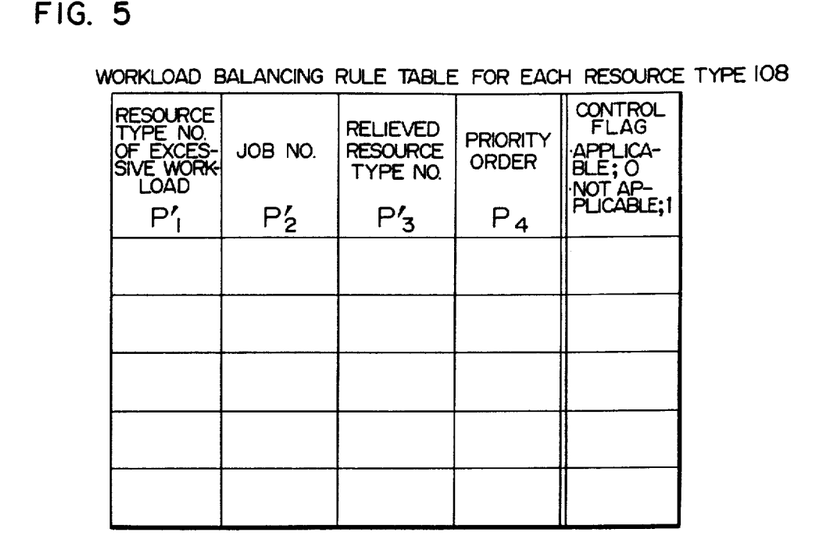
FIG. 5 is a workload allocation rule table (for each resource type)

FIG. 5 shows the structure of a workload balancing rule table (for each resource type) 108. As a descriptive format for workload balancing rules for each resource type, there is provided a basic statement of "IF (workload exceeds the resource type capacity), THEN (relieve job [$P_2$] by resource type [$P_3$], with priority [$P_4$])". The input part 102 stores the contents of a rule in the table 108 shown in FIG. 5, in accordance with the names and numerical values $P_1$ to $P_4$.

The names $P_1$ to $P_3$ are converted by the editor in the computer into corresponding numbers $P_1'$ to $P_3'$.

Figure 6:
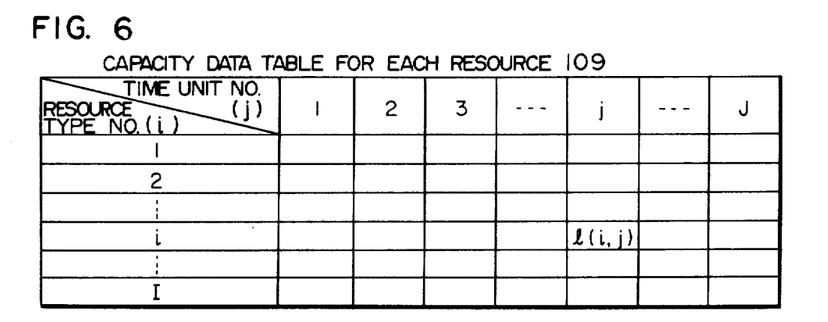
FIG. 6 is a capacity data table (for each resource type)

FIG. 6 shows the structure of a capacity data table (for each resource type) 109. The table stores capacity data $l(i, j)$ for each resource type number (i) and each time unit number (j). Based on the data, it is evaluated if the workload for each resource type is in excess of the resource type capacity.

Figure 7:
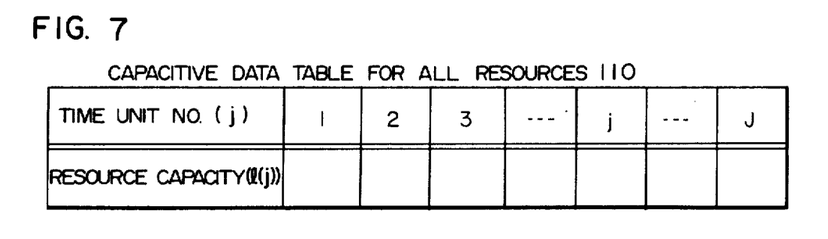
FIG. 7 is a capacity data table (for all resources)

FIG. 7 shows the structure of a capacity data table (for all resources) 110. The table stores capacity data (for all resources) $l(j)$ for each time unit number $$l(j) = \sum_{j=1}^{I} l(i, j).$$

Figure 8:
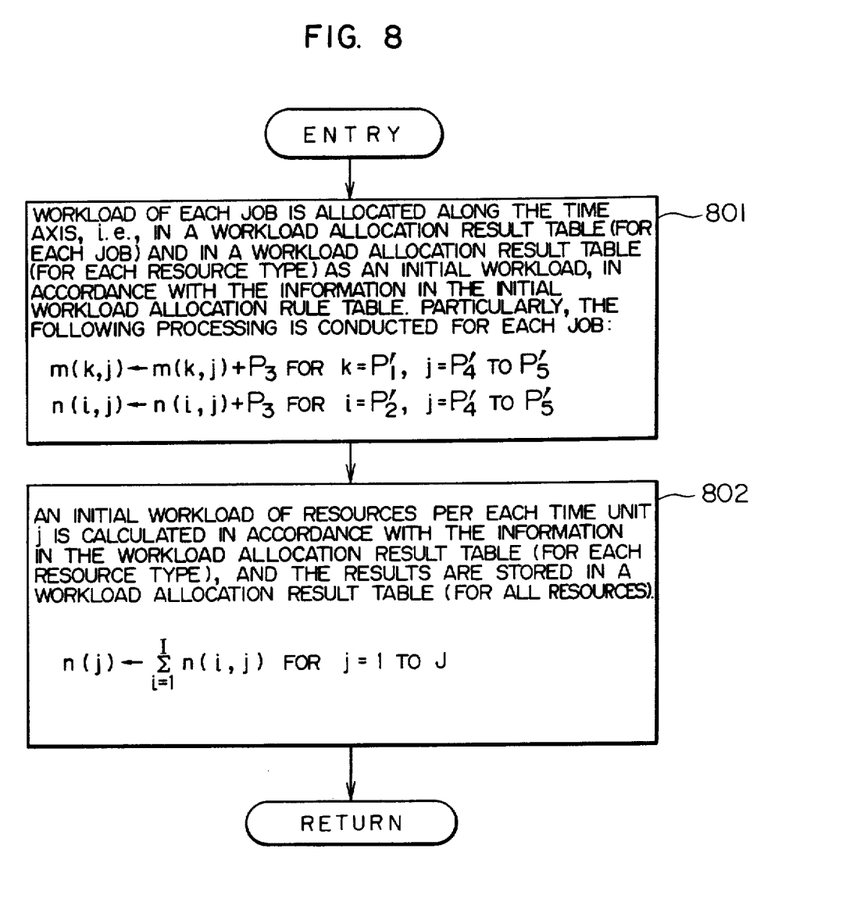
FIG. 8 is a flow chart showing a processing by the initial workload allocation part.
Figure 9:
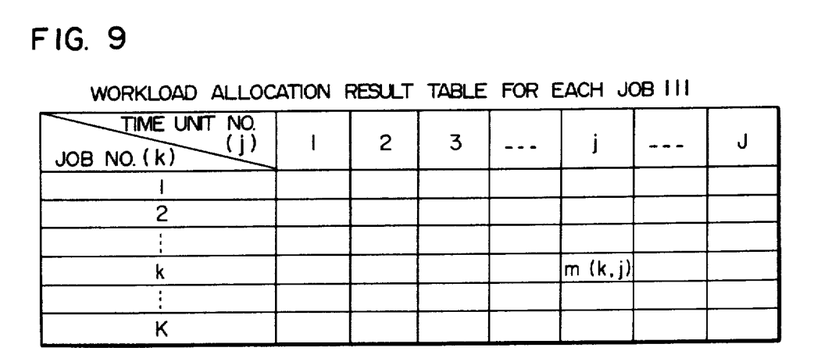
FIG. 9 is a workload allocation result table (for each job)
Figure 10:
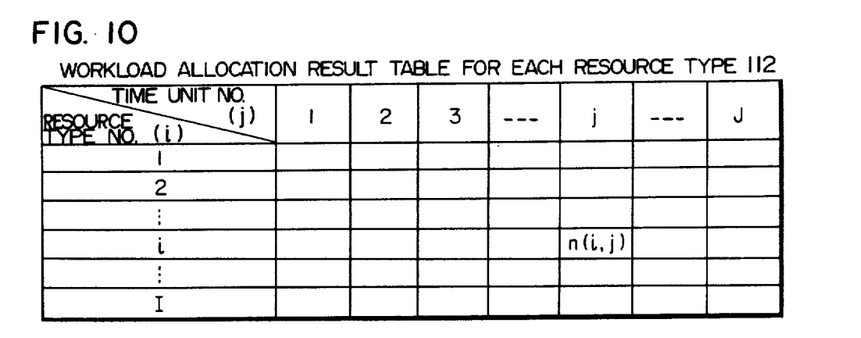
FIG. 10 is a workload allocation result table (for each resource type)

Next, the initial workload allocation part 103 will be described. By this part, an initial workload allocation is performed. The processing flow is shown in FIG. 8. First, at step 801 a workload of each job is allocated along the time axis (i.e., in a workload allocation result table (for each job) 111, and in a workload allocation result table (for each resource type) 112) as an initial workload, in accordance with the information in the initial workload allocation rule table 106. Particularly, the following processing is conducted for each job:

$$m(k, j) \leftarrow m(k, j) + P_3 \text{ for } k = P_1', j = P_4' \sim P_5'$$

$$n(i, j) \leftarrow n(i, j) + P_3 \text{ for } i = P_2', j = P_4' \sim P_5'$$

wherein $m(k, j)$ denotes an item in the workload allocation result table (for each job) 111 shown in FIG. 9, which item represents a workload of a job number k at a time unit number j, and wherein $n(i, j)$ denotes an item in the workload allocation result table (for each resource type) 112 shown in FIG. 10, which item represents a workload for a resource type number i at a time unit number j.

Figure 11:
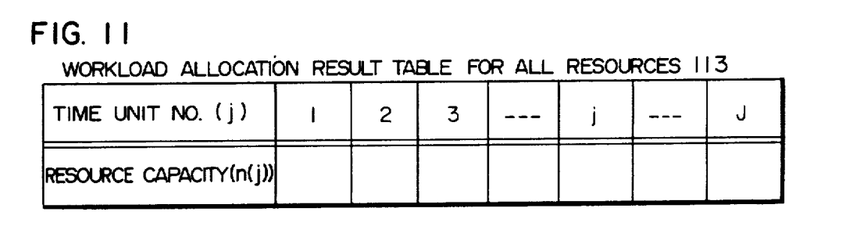
FIG. 11 is a workload allocation result table (for all resources)

Next, at step 802 an initial workload of resources per each time unit j is calculated in accordance with the information in the workload allocation result table (for each resource type) 112 shown in FIG. 10, and the results are stored in a workload allocation result table (for all resources) shown in FIG. 11. The processing is performed by $$n(j) = \sum_{j=1}^{I} n(i, j)$$

for j=1 to J, wherein $n(j)$ denotes an item in the workload allocation result table (for all resources) 113 shown in FIG. 11, which item represents a workload for all resources at a time unit number j.

Figure 12:
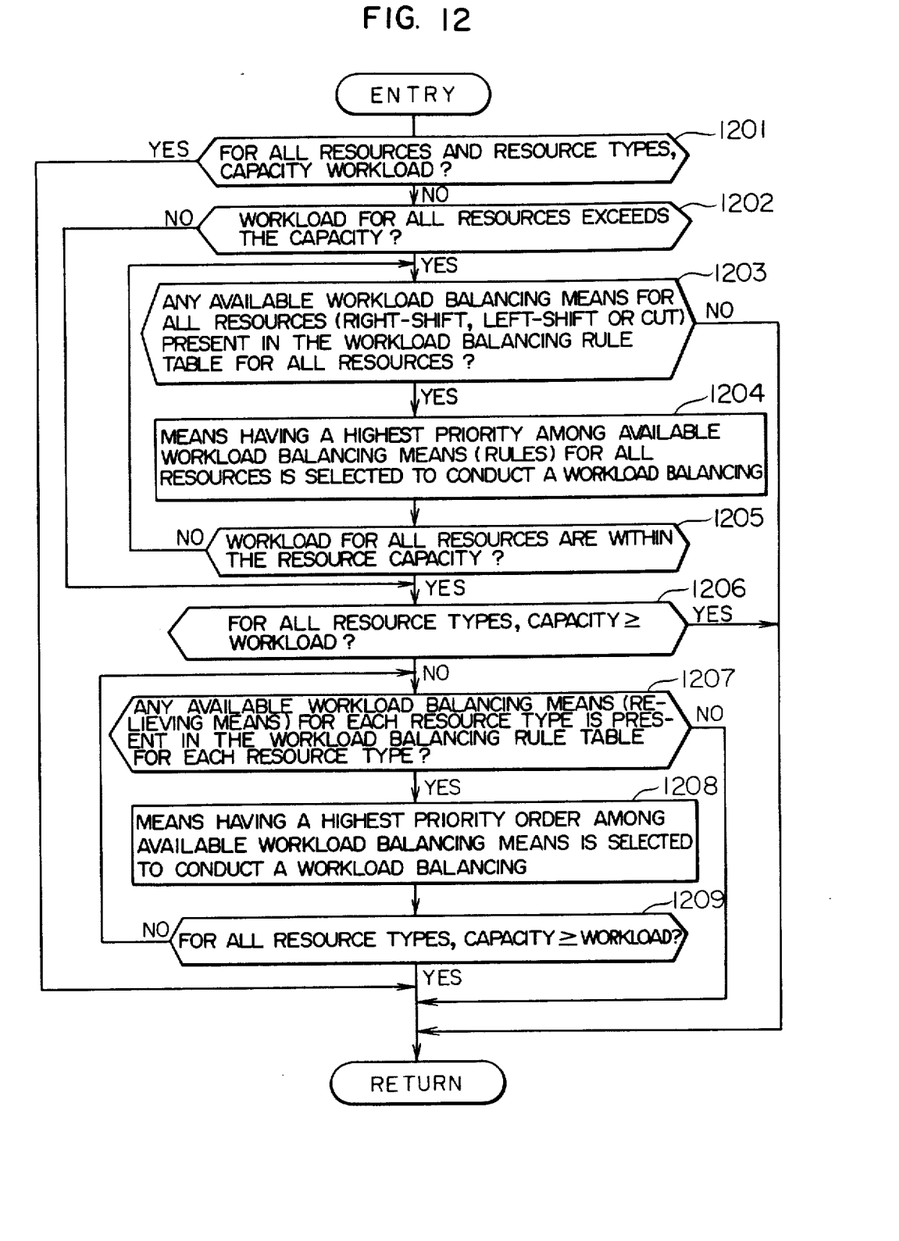
FIG. 12 is a flow chart showing a processing by the workload allocation part.

Next, the workload balancing part 104 will be described. In this part, a workload balancing is performed to balance a workload within the resource capacity if the workload is found in excess of the resource capacity at the initial workload allocation. It is necessary in this case that the workload for all resources be within the resource capacity. To this end, the basic workload allocation functions, i.e., start time delaying and hastening functions 114 and job cutting function 115 are first adopted. Thereafter, to make the workload of each resource type within the resource capacity, the job relieving function 116 is adopted. FIG. 12 is a flow chart illustrating such processing.

In the flow chart, first at step 1201 it is checked if the resource capacity is larger than the workloads of all resources and resource types. If the capacity is not larger than the workloads, the processing by the workload balancing part 104 stops. If the capacity is larger than the workloads, then the flow advances to the next step 1202. If the workload for all resources is not in excess of the capacity, step 1206 follows, whereas if affirmative at step 1202, step 1203 follows. At step 1203, it is checked if there is present any available workload balancing means for all resources (right-shift, left-shift or cut) in the workload balancing rule table (for all resources) 107 shown in FIG. 4. This judgement of availability is made in accordance with control flags in the table. The initial values of the control flags have been set such, that all means are available. If there is no means which indicates that a workload balancing is not possible, the processing stops. If there is any available means, the flow advances to step 1204 whereat means having a highest priority among available workload balancing means (rules) for all resources is selected to conduct a workload balancing.

If the workload for all resources becomes within the resource capacity by virtue of the workload balancing at step 1205, the flow advances to the next step 1206. If the capacity is larger than the workloads of all resource types at step 1206, then the processing stops. If not, the flow advances to step 1207 whereat it is checked if there is any available workload balancing means (relieving means) for each resource type in the workload balancing rule table (for each resource type). If not, the processing stops. If affirmative, step 1208 follows to select means having a highest priority order among available workload balancing means to conduct a workload balancing which is performed by the job relieving function 116 shown in FIG. 1. If the workloads become smaller than the capacity for all resource types by the workload balancing at step 1209, the processing stops.

Figure 14:
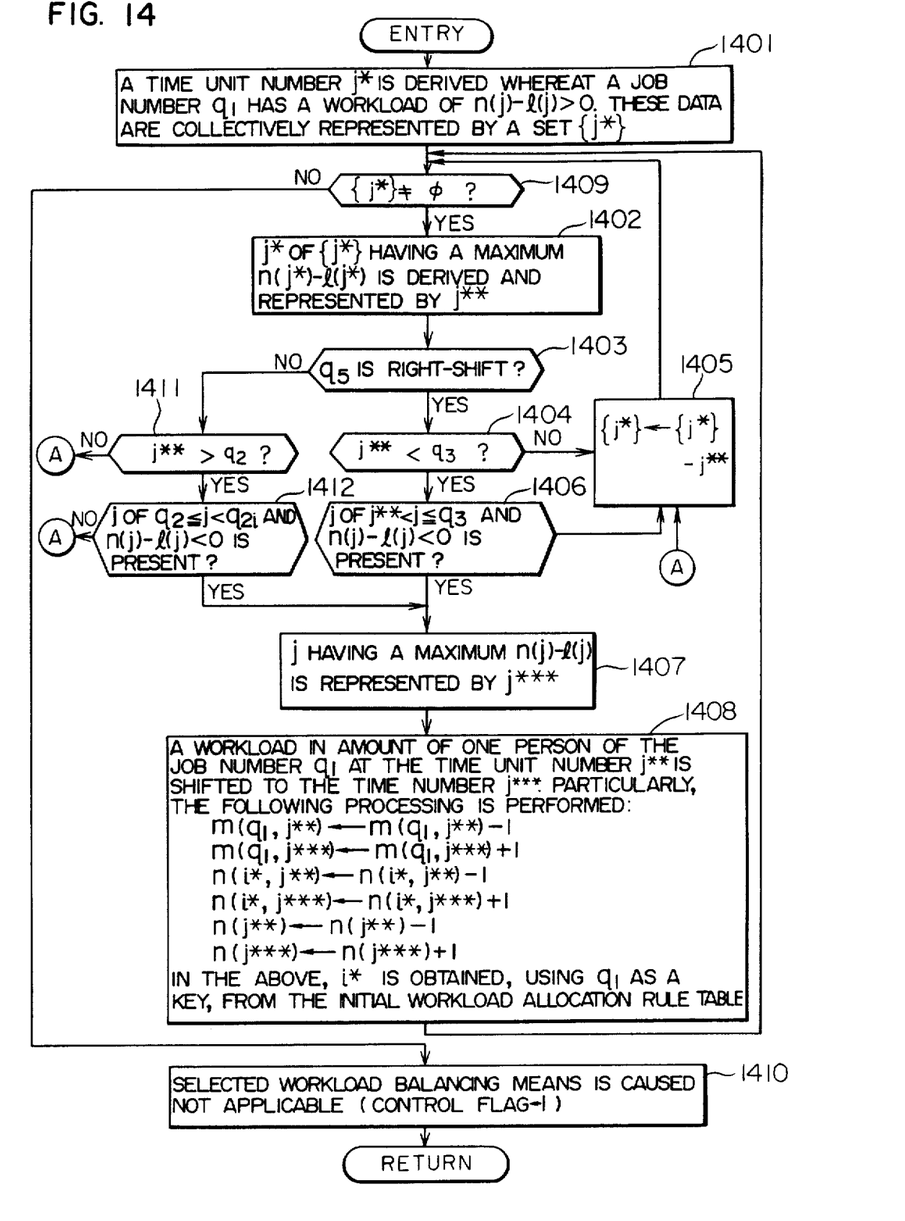
FIG. 14 is a flow chart showing the detail of the start time delaying and hastening functions by the workload balancing means for all resources.
Figure 15:
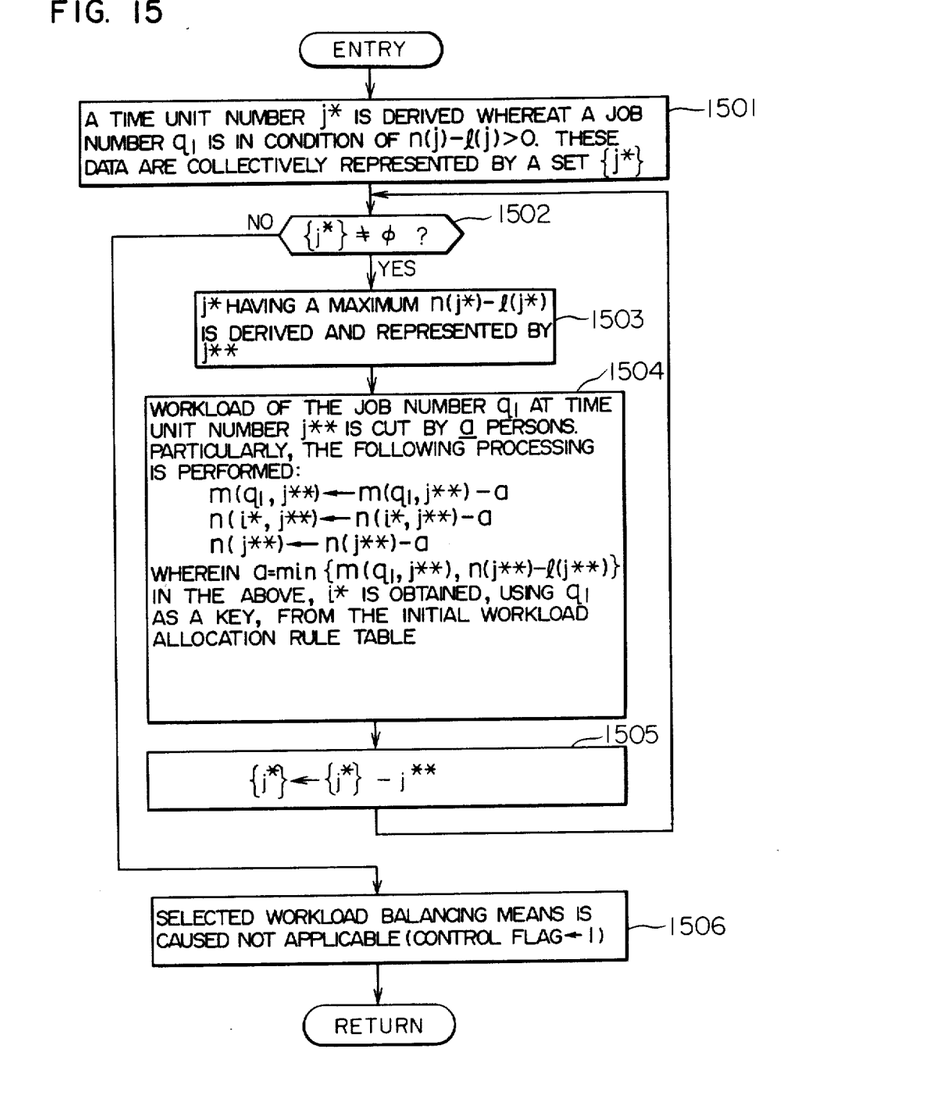
FIG. 15 is a flow chart showing the detail of the job cutting function by the workload balancing means for all resource.

Next, the detail of step 1204 of FIG. 12 will be given with reference to FIGS. 13 to 15.

Figure 13:
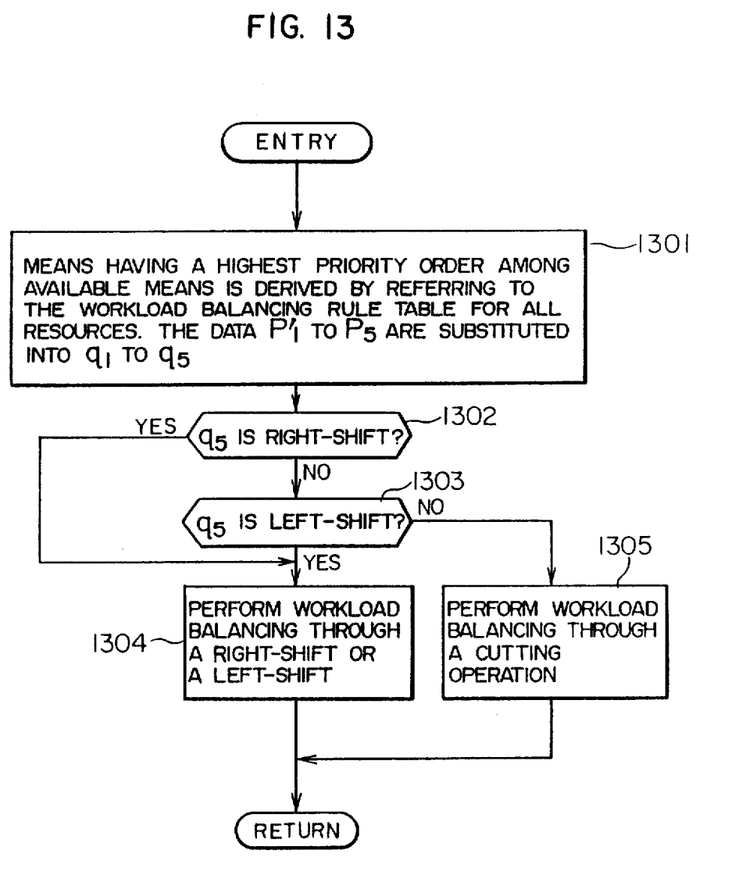
FIG. 13 is a flow chart showing a processing by the workload allocation part for all resources, which is a part of the flow chart of FIG. 12.

As shown in FIG. 13, first at step 1301, means having a highest priority order among available means is derived by referring to the workload balancing rule table (for all resources) 107 shown in FIG. 4. The data $P_1'$ to $P_5$ are substituted into $q_1$ to $q_5$. Using $q_5$ storing a name of the workload balancing means, it is checked at step 1302 and 1303 if it represents a right-shift or a left-shift. In case of a right-shift or a left-shift, a workload balancing is performed to complete such processing. If it is neither a right-shift nor a left-shift, a workload balancing through a cutting function is performed to complete such processing.

Next, the detail of step 1304 will be given with reference to FIG. 14.

First at step 1401, a time unit number $j^*$ is derived whereat a job number $q_1$ to be right- or left-shifted has a workload in excess of a predetermined number of persons ($n(j)-l(j)>0$). These data are collectively represented by a set $\{j^*\}$. Next, at step 1402, $j^*$ of $\{j^*\}$ having a maximum $n(j^*)-l(j^*)$ is derived and represented by $j^{}$. The reason for this derivation is that it is proper to balance a peak workload at first. Then at step 1403, it is checked if the workload balancing means is a right-shift. If affirmative, it is checked at step 1404 if $j^{}$ is smaller than $q_3$ (latest finish time unit number). If not smaller, it means that a right-shift is not available so that $j^{}$ is removed from $\{j^{}\}$ at step 1405. If smaller, it is checked at step 1406 if there is a time unit number which can be subjected to a right-shift. In other words, it is checked if there is $j$ which suffices $j^{}<j \leqq q_3$ and $n(j)-l(j)<0$. If not, the flow returns to step 1405. If affirmative, $j$ having a minimum (or minimum workload) $n(j)-l$ ($j$) is derived and represented, at step 1407, by $j^{*}$ which is a or right-shift of $j^{}$. To balance the workload one by one minutely, a workload in amount of one person of the job number $q_1$ at the time unit number $j^{}$ is shifted to the time number unit $j^{***}$. Particularly, the contents of the workload allocation result table (for each job) 111 shown in FIG. 9, the workload allocation result table (for each resource type) 112 shown in FIG. 10 and the workload allocation result table (for all resources) 113 shown in FIG. 13 are changed as in the following:

$$m(q_1, j^{}) \leftarrow m(q_1, j^{})-1$$

$$m(q_1, j^{*}) \leftarrow m(q_1, j^{*})+1$$

$$n(i^*, j^{**}) \leftarrow n(i^*, j^{**})-1$$

$$n(i^*, j^{***}) \leftarrow n(i^*, j^{***})+1$$

$$n(j^{}) \leftarrow n(j^{})-1$$

$$n(j^{*}) \leftarrow n(j^{*})+1$$

In the above, $i^*$ is obtained, using $q_1$ as a key, from the initial workload allocation rule table.

After completion of step 1408, the flow returns to step 1409 to which step 1405 is also returned. It is checked at step 1409 if there is a time unit number $j^*$ whose workload is shiftable. Namely, if the set $\{j^*\}$ is not an empty set (0), the above processess are repeated. If $\{j^*\}=0$, selected workload balancing means is caused not applicable. Particularly, the control flag of workload balancing means in the workload balancing rule table (for all resources) 107 shown in FIG. 4 is changed from 0 to 1 at step 1410.

In case of a left-shift instead of a right-shift as described so far, steps 1411 and 1412 corresponding to steps 1412 and 1406, respectively, are executed. The description therefore is omitted due to a similar operation to the latter steps.

The above description has been directed to step 1304 of FIG. 13. Next, the detail of a workload balancing through a cutting operation at step 1305 will be given with reference to FIG. 15.

First at step 1501, a time unit number $j^*$ is derived whereat a job number $q_1$ is in condition of $n(j)-l(j)>0$. These data are collectively represented by a set $\{j^*\}$. Next, at step 1502, it is checked if the set $\{j^*\}$ is an empty set (0). If $\{j^*\}$ is not equal to 0, $j^*$ having a maximum $n(j^*)-l(j^*)$ is derived and represented by $j^{}$ at step 1503. A workload of the job number $q_1$ at time unit number $j^{}$ is cut by a persons. a is a minimum of $\{m(q_1, j^{}), n(j^{})-l(j^{**})\}$. The first term represents a workload which can be cut, whereas the second term represents an amount of excessive workload. Particularly, at step 1504 the contents of the workload allocation result tables are changed as in the following:

$$m(q_1, j^{}) \leftarrow m(q_1, j^{}) - a$$

$$n(i^*, j^{**}) \leftarrow n(i^*, j^{**}) - a$$

$$n(j^{}) \leftarrow n(j^{}) - a$$

In the above, $i^*$ is obtained, using $q_1$ as a key, from the initial workload allocation rule table.

After completion of the cut operation for the time unit number $j^{}$, the $j^{}$ is removed from the set $\{j^*\}$ at step 1505 to return to step 1502. If the set $\{j^*\}$ is not 0, the similar processes are repeated. If $\{j^*\} = 0$, the flow advances to step 1506 whereat selected workload balancing, i.e., cutting means is caused not applicable. Particularly, the control flag of workload balancing means in the workload balancing rule table (for all resources) is changed from 0 to 1.

Figure 16:
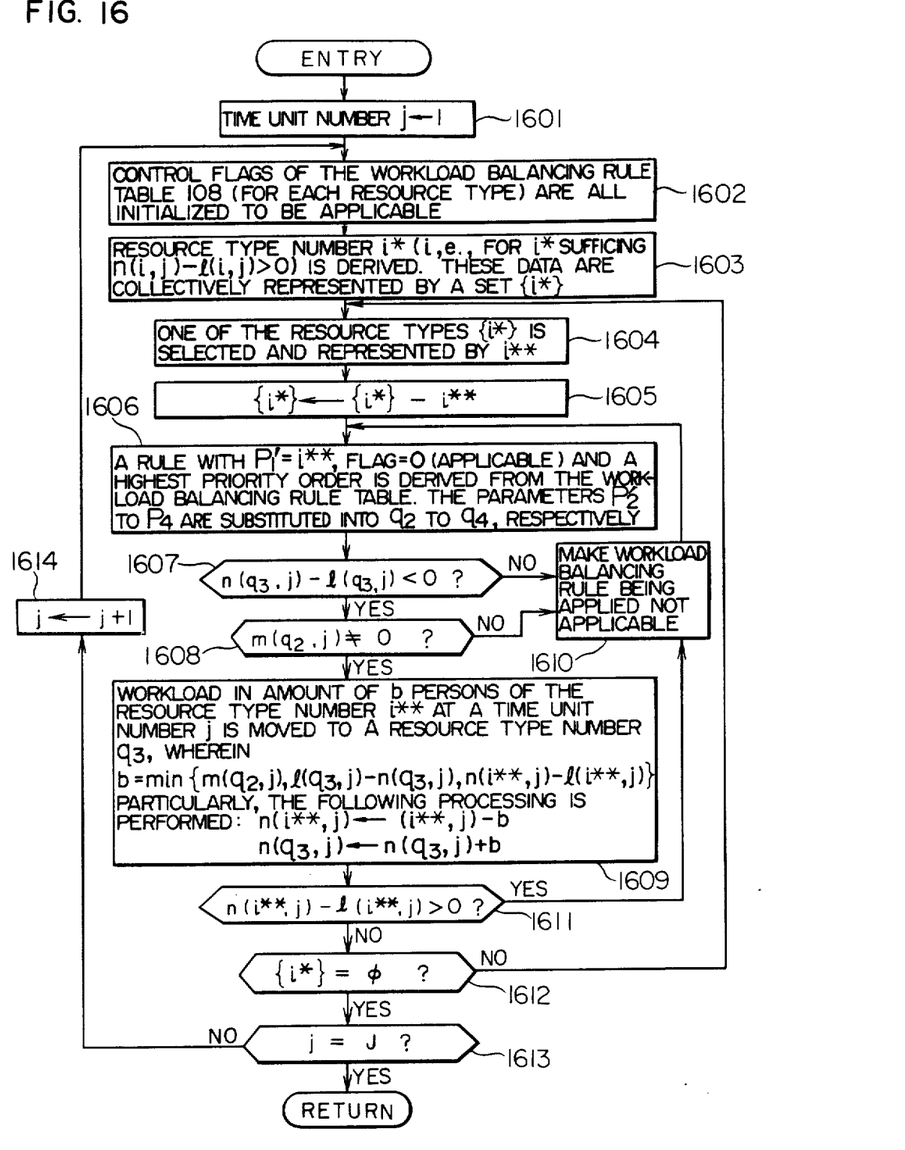
FIG. 16 is a flow chart showing the detail of the job relieving function which is the workload balancing means for each resource type.

Next, the detail of step 1208 shown in FIG. 12 will be given with reference to FIG. 16. First at step 1601, the time unit number j is set at 1. The control flags of the workload balancing rule table (for each resource type) 108 are all initialized to be applicable at step 1602. Next at step 1603, a resource type number $i^*$ is derived whose workload exceeds its capacity at a time unit number j (i.e., for i sufficing $n(i, j) - l(i, j) > 0$). These data are collectively represented by a set $\{i^*\}$ which designates a resource type having an excessive workload and not subjected to a workload balancing. One of the resource types $\{i^*\}$ is selected and represented by $i^{}$ at step 1604. The resource type number $i^{}$ to be balanced is removed from the set $\{i^*\}$ at step 1605.

The resource type number $i^{}$ is then subjected to a workload balancing. First at step 1606, a rule with $P_1' - i^{}$, control flag $= 0$ (applicable) and a highest priority order is derived from the workload balancing rule table. The parameters $P_2'$ to $P_4$ are substituted into $q_2$ to $q_4$, respectively. If a workload can be entered into a relief destination at step 1607 (i.e., $n(q_3, j) - l(q_3, j) < 0$), and if there is a job number $q_2$ to be relieved at the time unit number j at step 1608 (i.e., $m(q_2, j) \neq 0$), then the relieving processing advances to step 1609. If one of the above two conditions is not met, the rule concerned cannot be used for the relieving operation so that the workload balancing rule is caused not applicable at step 1610. The flow returns to step 1606 to derive a next rule to be applied.

At step 1609 performing a workload balancing, a workload in amount of b persons of the resource type number $i^{}$ at a time unit number j is moved to a resource type number $q_3$, wherein $$b = \min\{m(q_2, j), l(q_3, j) - n(q_3, j), n(i^{}, j) - l(i^{**}, j)\}$$

Particularly, the workload allocation result table (for each workload type) 108 is changed as in the following:

$$n(i^{}, j) \leftarrow l(i^{}, j) - b$$

$$n(q_3, j) \leftarrow n(q_3, j) + b$$

If it is decided at step 1611 that the workload after the above relieving operation is not made within its capacity (i.e., if $n(i^{}, j) - l(i^{}, j) > 0$), the flow returns to step 1610. If the workload of the resource type number $i^{**}$ is made within its capacity, it is checked at step 1612 if there is another resource type number not subjected to a workload balancing (i.e., $\{i^*\} = 0$?). If $\{i^*\}$ is not 0, the flow returns to step 1604. If $\{i^*\}$ is 0, it is checked at step 1613 if the workload balancing has been completed for all the time unit numbers (i.e., $i = j$?). If not ($i < J$), $j + 1$ is substituted to j at step 1614. If $i = J$, the processing stops.

After the above workload balancing procedure, the output part shown in FIG. 1 outputs the contents of the workload allocation result table (for each job) 111, the workload allocation results table (for each resource type) 112 and the workload allocation result table (for all resources) 113. However, if the workload is decided not to be within the resource capacity, such a status is informed.

According to this embodiment, in contrast with the conventional system, the job can be allocated to any desired time at an initial workload allocation and in addition, left-shift, job cutting and relieving functions can be incorporated. Thus, a job scheduling having a variety of application fields can be realized. Further, a descriptive format of a rule with a definite statement is provided for expressing the know-how of the workload allocation and balancing, thus making it very easy to describe, add and modify the know-how. Furthermore, the system includes fundamental scheduling functions so that a suitable job scheduling can be realized in short time by merely changing the know-how.

According to the present invention, various conditions on the workload allocation and balancing can be taken into consideration. Thus, a suitable job scheduling can be realized for a variety of application fields to accordingly enable improved services and reduced manpower. Further, various conditions can be expressed in the form of rule so that the description, addition and modification of a rule are easy. Furthermore, the system includes fundamental scheduling functions so that even if the conditions to be considered are changed, the system can readily cope with such change.

We claim:

1. A job scheduling method for scheduling of job allocation to various resources comprising the steps of:
    inputting data associated with jobs and resources;
    allocating a workload of each job to each time unit along a time axis in units of job;
    allocating said workload to said each time unit in units of resource type;
    calculating an initial workload for all resources at said each time unit, in accordance with said workload allocated in units of resource type;
    performing a first workload balancing for a time unit whose initial workload for all resources exceeds a resource capacity, so as to make the workload at said time unit within said resource capacity;
    after said first workload balancing, performing a second workload balancing so as to make the workload allocated in units of resource type within its resource capacity; and
    outputting, as a job schedule, each workload at said each time unit obtained by said second workload balancing.

2. A job scheduling method according to claim 1, wherein said first workload balancing step includes a step of performing at least one of right-shift, left-shift and cutting processings for an excessive workload at said each time unit.

3. A job scheduling method according to claim 1, wherein said second workload balancing step includes a step of performing a relieving function for relieving a processing by one resource to another resource.

4. A job scheduling system for scheduling of job allocation to various resources comprising:
   means for inputting data associated with jobs and resources;
   means for allocating a workload of each job to each time unit along a time axis in units of job;
   means for allocating said workload to said each time unit in units of resource type;
   means for calculating an initial workload for all resources at said each time unit, in accordance with said workload allocated in units of resource type;
   means for performing a first workload balancing for a time unit whose initial workload for all resources exceeds a resource capacity, so as to make the workload at said time unit within said resource capacity;
   means for, after said first workload balancing, performing a second workload balancing so as to make the workload allocated in units of resource type within its resource capacity; and
   means for outputting, as a job schedule, each workload at said each time unit obtained by said second workload balancing.

5. The job scheduling system according to claim 4, wherein said means for performing the first workload balancing includes at least one of right-shift, left-shift and cutting processing means for an excessive workload at said each time unit.

6. The job scheduling system according to claim 4, wherein said means for performing the second workload balancing includes relieving means for relieving a processing by one resource to another resource.

* * * * *